US008854465B1

(12) United States Patent
McIntyre

(10) Patent No.: US 8,854,465 B1
(45) Date of Patent: Oct. 7, 2014

(54) VEHICLE SECURITY SURVEILLANCE SYSTEM AND METHOD FOR SURVEILLANCE OF A VEHICLE

(76) Inventor: Jason Charles McIntyre, San Antonio, TX (US)

(*) Notice: Subject to any disclaimer, the term of this patent is extended or adjusted under 35 U.S.C. 154(b) by 0 days.

(21) Appl. No.: 13/225,464

(22) Filed: Sep. 4, 2011

Related U.S. Application Data

(63) Continuation-in-part of application No. 11/650,607, filed on Jan. 8, 2007, now abandoned.

(51) Int. Cl.
*H04N 7/18* (2006.01)
*G06F 17/30* (2006.01)

(52) U.S. Cl.
USPC ............................................ 348/148; 726/26

(58) Field of Classification Search
USPC ............................................ 348/148; 726/26
See application file for complete search history.

(56) References Cited

U.S. PATENT DOCUMENTS

| | | | |
|---|---|---|---|
| 5,586,186 A * | 12/1996 | Yuval et al. .................. | 380/30 |
| 5,926,210 A * | 7/1999 | Hackett et al. ............... | 348/158 |
| 5,978,017 A | 11/1999 | Tino | |
| 6,161,181 A * | 12/2000 | Haynes et al. ............... | 713/170 |
| 6,211,907 B1 * | 4/2001 | Scaman et al. ............... | 348/148 |
| 6,717,511 B2 | 4/2004 | Parker, Jr. et al. | |
| 6,735,506 B2 * | 5/2004 | Breed et al. ................. | 701/36 |
| 7,015,828 B2 | 3/2006 | Ueminami et al. | |
| 7,027,616 B2 | 4/2006 | Ishii et al. | |
| 7,050,089 B2 | 5/2006 | Nakamura | |
| 7,061,405 B2 | 6/2006 | Boyd et al. | |
| 7,064,657 B2 | 6/2006 | Becker et al. | |
| 7,091,833 B1 | 8/2006 | Davis | |
| 7,100,190 B2 | 8/2006 | Johnson et al. | |
| 7,106,365 B1 | 9/2006 | Sogawa | |
| 7,110,021 B2 | 9/2006 | Nobori et al. | |
| 7,111,968 B2 | 9/2006 | Bauer et al. | |
| 7,123,974 B1 * | 10/2006 | Hamilton ...................... | 700/87 |
| 7,339,608 B2 * | 3/2008 | Ryley et al. .................. | 348/155 |
| 7,525,570 B2 * | 4/2009 | Kiely et al. .................. | 348/143 |
| 7,617,124 B1 * | 11/2009 | Ronning et al. ............. | 705/26.61 |
| 7,698,152 B2 * | 4/2010 | Reid ............................. | 705/2 |
| 7,702,135 B2 * | 4/2010 | Hill et al. .................... | 382/107 |
| 7,707,642 B1 * | 4/2010 | Herbach et al. ............. | 726/27 |
| 7,768,548 B2 * | 8/2010 | Silvernail et al. ........... | 348/148 |
| 7,817,546 B2 | 10/2010 | Filsfils et al. | |
| 7,893,548 B2 | 2/2011 | Quinones et al. | |

(Continued)

OTHER PUBLICATIONS

Lawida, Arthur et al.; Valet Parking Goes High-Tech; Mar. 2005; National Parking Association; http://www.servicetrackingsystems.net/pdf/parkingmagreprint.pdf.*

*Primary Examiner* — Madhu Woolcock

(57) ABSTRACT

A vehicle security surveillance system includes a camera installed within a vehicle's interior a memory device coupled to the camera, an external device interface coupled to the memory device, a wiring interface coupled to a power supply, a network interface module, and an image packet application. The camera is normally rendered in a "stand-by" mode until trigger activated to generate digital images of the interior of the vehicle. An image packet application facilitates, generation of at least one vehicle interior image packet. On receiving a trigger from the motion sensors, the camera is rendered to record digital images to the memory device and the image packet application initiates generation of at least one vehicle interior image packet including the recorded digital images and encrypts each digital image. The at least one vehicle interior image packet is sent from the vehicle security surveillance system via the network interface module.

13 Claims, 5 Drawing Sheets

(56) References Cited

U.S. PATENT DOCUMENTS

| | | |
|---|---|---|
| 7,894,354 B2 | 2/2011 | Grovenburg |
| 2003/0105831 A1* | 6/2003 | O'Kane .................. 709/217 |
| 2003/0131002 A1* | 7/2003 | Gennetten et al. ............. 707/10 |
| 2003/0217008 A1* | 11/2003 | Habegger et al. ............. 705/51 |
| 2004/0054893 A1* | 3/2004 | Ellis .................. 713/165 |
| 2005/0034158 A1* | 2/2005 | DeLaVega .................. 725/75 |
| 2005/0165796 A1* | 7/2005 | Moore .................. 707/100 |
| 2005/0283438 A1* | 12/2005 | Brownewell et al. ........... 705/50 |
| 2006/0268114 A1* | 11/2006 | Chan et al. ................ 348/207.1 |
| 2007/0022298 A1* | 1/2007 | Morgan, III .................. 713/182 |
| 2007/0064108 A1* | 3/2007 | Haler .................. 348/148 |
| 2007/0109107 A1* | 5/2007 | Liston .................. 340/426.15 |
| 2007/0244877 A1* | 10/2007 | Kempka .................. 707/5 |
| 2008/0106393 A1* | 5/2008 | Bedell et al. ................ 340/438 |
| 2009/0198740 A1* | 8/2009 | Braun et al. .................. 707/201 |
| 2010/0149335 A1 | 6/2010 | Miller, II |
| 2010/0312908 A1* | 12/2010 | Yoshioka .................. 709/231 |
| 2012/0157063 A1* | 6/2012 | Zubas et al. ............. 455/414.1 |

* cited by examiner

| VEHICLE INTERIOR IMAGE PACKET HEADER | |
|---|---|
| INVITE / ACCEPT STATUS | i 72 .... |
| INVITE / ACCEPT CONTACT | i .... |
| INVITE / ACCESS ENCODING | i .... |
| INVITE / ACCESS LANGUAGE | .... |
| CALL ID | ID - D70849 - 62377 |
| CONTACT | ...... |
| CONTENT TYPE | ...... |
| CONTENT LENGTH | 512 |
| FROM | B67001314GCDR |
| TIME / DATE STAMP | on CDT 1102 : 0725 2011 |

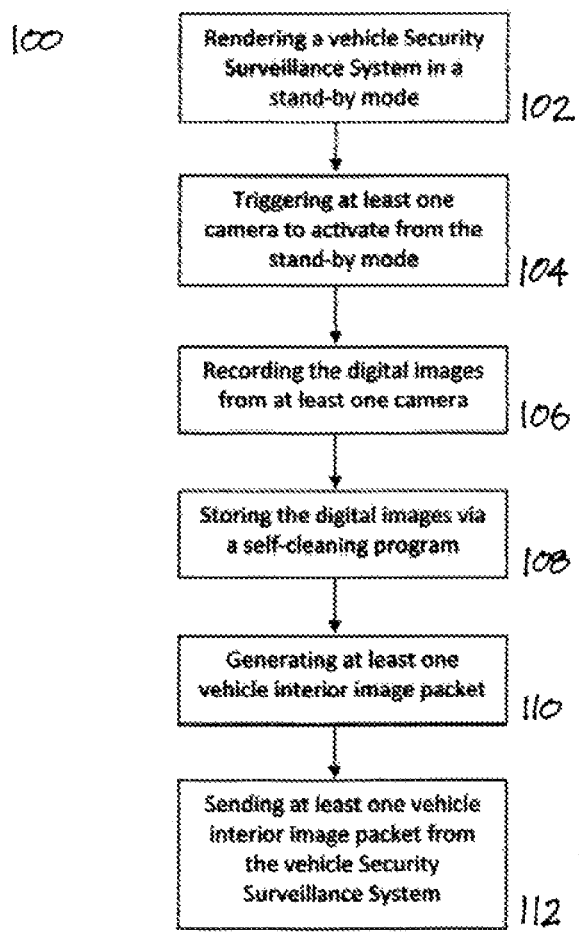

VEHICLE SECURITY SURVEILLANCE SYSTEM AND METHOD FOR SURVEILLANCE OF A VEHICLE

CROSS REFERENCE TO RELATED APPLICATIONS

This application is a Continuation-in-Part of a Non-Provisional application Ser. No. 11/650,607, filed Jan. 8, 2007 now abandoned, which claims the benefit under 35 U.S.C. §120 from entitled "Vehicle Security Surveillance System", by inventors Jason Charles McIntyre and Jeff Kirk Ekdahl, the entirety of the disclosure of the above referenced Application is hereby incorporated by reference as if fully set forth herein.

BACKGROUND OF THE INVENTION

1. Technical Field

The present invention generally relates to a security system. More particular, but not by way of limitation, the present invention relates to a vehicle security surveillance system and method for surveillance of a vehicle featuring a network interface module for sending at least one vehicle interior image packet from the vehicle security surveillance system.

2. Description of Related Art

Present day vehicle security systems are predominantly designed to alert bystanders that a nearby, secured vehicle is in the process of or the immediate result of a burglary or vandalization. Typically, these vehicle alarm systems are unreliable for several reasons such as, among others, nearby individuals are often indifferent to the alarm and to the probable nefarious causes for such an audible warning. At times, current vehicle security systems may be unreliable in that such an alarm might sound as a result of non-criminal stimuli. Law enforcement officers usually do not fully investigate these types of property crimes as so little evidence is typically available to capture and convict a suspect to a vehicular burglary or vandalization.

Vehicular vandalism and burglary are both crimes that are difficult to solve due to the lack of or very limited legally admissible direct evidence or witness testimony. Such evidence is not only valued by law enforcement agencies but also insurance companies, courts of law, and neighborhood associations in addition to victimized vehicle owners. Inasmuch, most vehicle alarm systems today are reactive to such property crimes and often do not proactively deter such crimes. Admissible evidence may take the form of testimony from an eyewitness or demonstrative evidence such as a video or series of still photographs. As long as a legal prosecutor lays a proper foundation for admissible evidence, that prosecutor may enter a variety of demonstrative pieces of evidence or testimony. Once admitted, it is often difficult to refute demonstrative evidence such as a video that clearly show acts of theft or vandalism.

Unfortunately, there is no known device for capturing digital images of the interior of the vehicle while it is being burglarized or vandalized that can be used as admissible evidence of a crime. Moreover, there is no known device for sending at least one vehicle interior image packet or remote viewing on a user equipment device at the time of the crime. Therefore, a need exists for a vehicle security surveillance system and method of surveillance that sends at least one encrypted vehicle interior image packet therefrom.

SUMMARY

Generally speaking, pursuant to various embodiments, aspects of the present disclosure provides a vehicle security surveillance system and a method for surveillance of a vehicle. The vehicle security surveillance system includes a camera installed within a vehicle's interior a memory device coupled to the camera, an external device interface coupled to the memory device, a wiring interface coupled to a power supply, a network interface module, and an image packet application. The camera is normally rendered in a "stand-by" mode until trigger activated to generate digital images of the interior of the vehicle. The camera includes motion sensors and software. The external device interface facilitates removal of digital images from the memory device. The software of the camera facilitates operation of the camera, motion sensors, and memory device. The image packet application facilitates, at least in part, generation of at least one vehicle interior image packet. Operatively, on receiving a trigger from the motion sensors, the camera is rendered to record digital images to the memory device and the image packet application initiates generation of at least one vehicle interior image packet including the recorded digital images and encrypts each digital image. The at least one vehicle interior image packet including recorded digital images is sent, in encrypted format, from the vehicle security surveillance system via the network interface module.

Moreover, the vehicle security surveillance system implements the methods generally as follows. A vehicle security surveillance system is rendered in a stand-by mode while the vehicle is parked and triggers, via the motion sensors, at least one camera provided by the vehicle security surveillance system to activate from the stand-by mode and generate digital images of the interior of the vehicle with the at least one camera. Software embodied in a processor coupled to the camera records the digital images from the at least one camera to the memory device and stores the digital images via a self cleaning program executed by the software. An image packet application provided by the vehicle surveillance system generates at least one vehicle interior image packet including the recorded digital images. Generally, a network interface module from the vehicle security surveillance system sends, in encrypted format, the at least one vehicle interior image packet from the vehicle security surveillance system.

Other aspects, advantages, and novel features of the present invention will become apparent from the detailed description of the present invention when considered in conjunction with the accompanying drawings.

DESCRIPTION OF THE DRAWINGS

The present invention is illustrated by way of example and not by limitation in the accompanying figures, in which like references indicate similar elements, and in which:

FIG. 8 is a schematic flow diagram demonstrating at least one exemplary method for surveillance of a vehicle.

Skilled artisans appreciate that elements in the Figures are illustrated for simplicity and clarity and have not necessarily been drawn to scale. For example, the dimensions of some of the elements in the Figures may be exaggerated relative to the other elements to help improve understanding of the embodiments of the present invention.

DETAILED DESCRIPTION

For a more complete understanding of the present invention, preferred embodiments of the present invention are illustrated in the Figures. Like numerals being used to refer to like and corresponding parts of the various accompanying drawings. It is to be understood that the disclosed embodiments are merely exemplary of the invention, which may be embodied in various forms.

In the disclosure and appended claims the term "vehicle interior image packet" refers to an individual image file relating to either visual or visual and sound images of the interior cabin where the driver, passengers, and cargo are primarily situated during transport that includes a combination of a single image frame, multiple image frames, as well as moving video images and multiple image frames continuously and sequentially generated. Each vehicle interior image packet is based on at least one digital image generated by the trigger activated camera such that the vehicle interior image packet is generated by the image packet application for transmission, in encrypted format, from the vehicle security surveillance system. In this disclosure and appended claims the term "time and date stamp" indicia generally refers to the time and date that a digital image is generated by a trigger-activated camera and specifically refers to the time and date obtained from the header of an outgoing vehicle interior image packet such that indicia associated with the time and date is visually displayed along with digital images from the corresponding image packet. In this disclosure and appended claims, the term "encrypted" refers to algorithm(s) for securing digital images from tampering to the extent that such digital images are deemed as legally admissible evidence. In this disclosure and appended claims the term "video share user equipment" refers to user equipment that is capable of operating under Video Share protocol, as defined by the Third Generation Partnership Project (3GPP) specification documents combining Circuit Switch (CS) and IP multimedia (IMS) services, TS 23.279, combining Circuit Switch (CS) and IP multimedia (IMS) services, TS 24.279. In this disclosure and appended claims the term "internet access device" refers to a device operable in a computer readable medium having access to the world wide web, internet.

Figure 1:
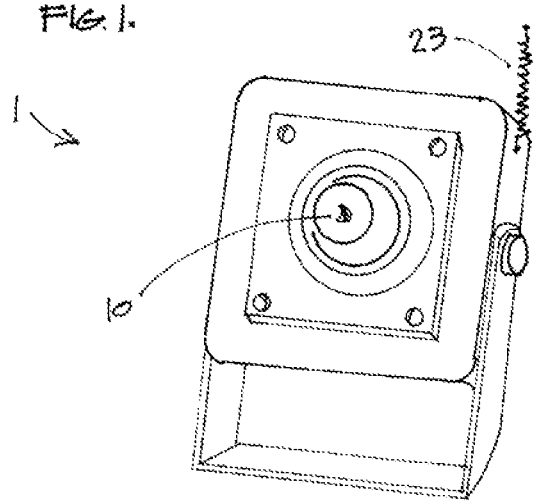
FIG. 1 is an isometric view from the front of a vehicle security surveillance system of the present disclosure.
Figure 2:
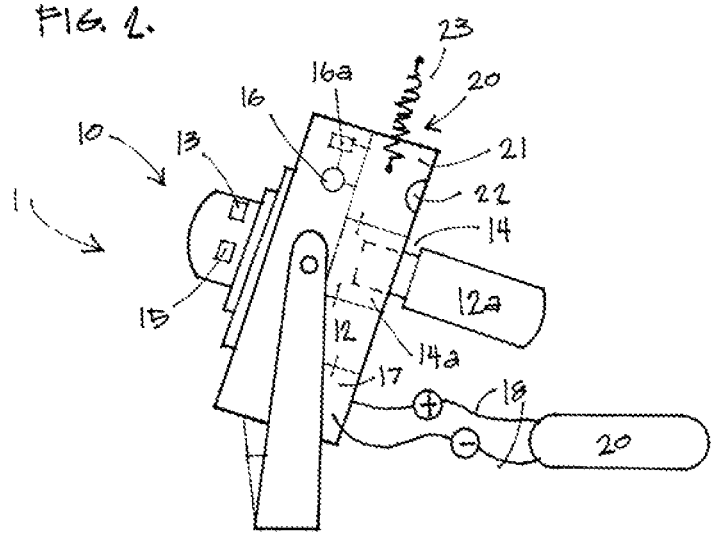
FIG. 2 is a schematic view of one embodiment of a vehicle security surveillance system from the side that is electrically coupled to a power supply.

As shown in FIGS. 1-2, a vehicle security surveillance system 1 in operation illustratively records vehicle burglaries and vandalism. The vehicle security surveillance system 1 will monitor a vehicle while in a stationary position, in the off position. Accordingly, the vehicle security surveillance system 1 will be in a "stand-by" mode while the vehicle is parked and only will activate and start recording images with at least one camera 10 when a motion sensor and/or shock sensors are triggered. The camera 10, in one embodiment, comprises a charge-coupled device (CCD) having integrated motion sensors and a memory. Each camera 10 will have the option to be used with a plurality of cameras 10 for visually recording the interior of a vehicle 6. In one embodiment, each camera 10 will operate independently of each other.

Figure 4:
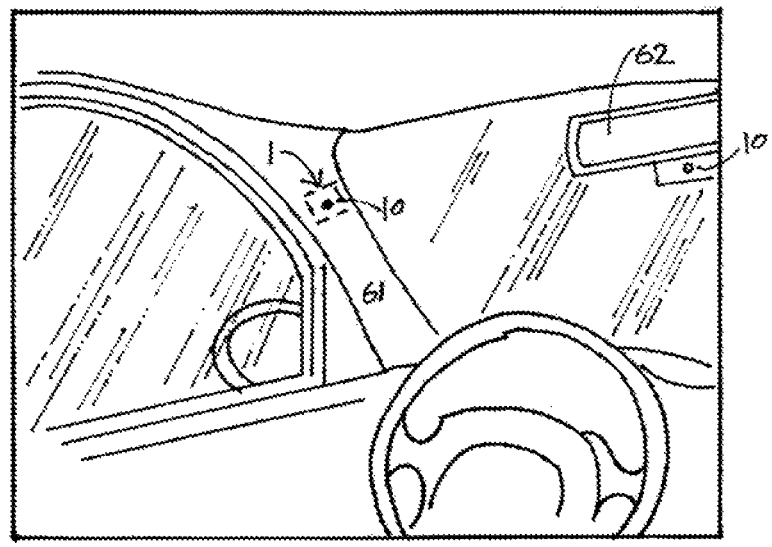
FIG. 4 is a schematic view illustrating a vehicle interior from the front driver side.
Figure 5:
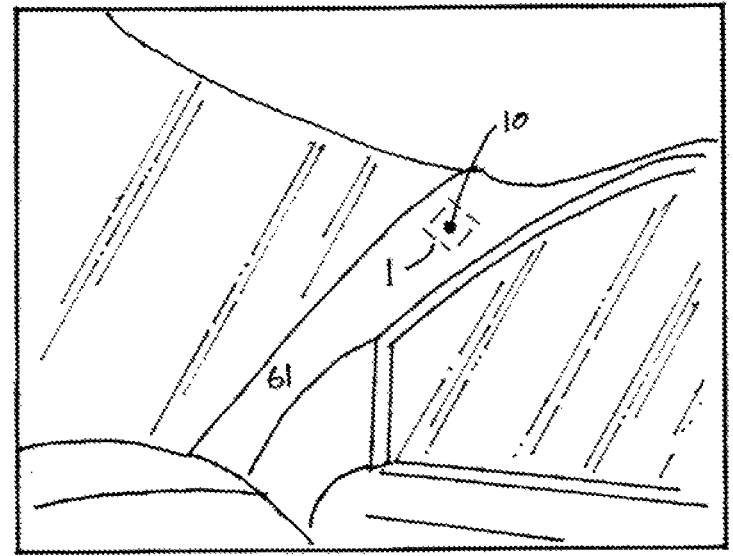
FIG. 5 is a schematic view illustrating a vehicle interior from a front passenger side.

The vehicle security surveillance system 1 will have the option of placing cameras 10 in several different locations depending on the type of vehicle (such as a car, truck, sport utility vehicle ("SUV"), commercial vehicles, construction equipment, etc.). When this security system 1 is installed into a passenger car and truck, the cameras 10 can be located in a vehicle dashboard, driver side "A" frame, see FIG. 4, passenger side "A" frame, see FIG. 5, dome light, and/or truck. The vehicle security surveillance system 1 can be installed at the factory with a built-in camera placed at the automotive manufacturer's preference. An aftermarket embodiment of the vehicle surveillance system 1 is configured for consumer installation at desired locations within a vehicle's interior. Illustratively, consider one example when the vehicle security surveillance system 1 is installed into a SUV-type vehicles such that a second camera may be installed halfway back on the vehicle's interior roof (at the dome light) to catch a burglar breaking into the rear of the vehicle or through the side of the doors on the vehicle.

In one embodiment, the vehicle security surveillance system 1 is placed anywhere in the vehicle as long as a power supply 20 is connected to wiring 18 on the camera 10. The vehicle security surveillance system 1 includes motion detectors and/or motion sensors 15. Once the motion sensor 15 is activated, each camera 10 will activate and start to digitally record the images, in an encrypted format, with a time and date stamp on the recorded image(s). In one embodiment, the encrypted, digitally recorded images will record onto a memory device 12 coupled to a corresponding camera 10, FIG. 4. In one embodiment, the memory device 12 features a flash memory, such that the memory device 12 will still have all the data saved to its memory when there is no power supplied to the memory device 12.

Software 16, implemented by at least one processor, will record and store encrypted digital files on each camera 10 in a folder and time/date stamp each file. Each folder will have a predetermined number of subfolders where the vehicle security surveillance system 1 stores the digital files. Once all subfolders are completely full, software 16 will delete the contents of the oldest subfolder and then record the next file in that (content-deleted) subfolder. This self-cleaning program ensures that there will always be at least one empty subfolder available to record any possible attempt to burglarize or vandalize the vehicle.

Downloading the images from the vehicle security surveillance system 1 is accomplished in several different ways. One way is to install a USB plug 14 on a spring load reel, FIG. 2. Accordingly, the camera 10 remains fixed to the vehicle while flash memory device 12A at the USB plug 14 is pulled out and connected to a computer for downloading the encrypted recorded images and updates to the Software 6.

An alternative embodiment allows a user to remove the vehicle security surveillance system 1 from the vehicle and connect it to a computer for downloading the encrypted recorded images and software 16 updates. The files will have the option of remaining on the memory device 12 or, alternatively, the files are deleted after downloading. The images will be encrypted so that each file cannot be tampered with. In some jurisdictions, encrypted files are suitable means for legally admissible evidence in a criminal proceeding.

This vehicle security surveillance system 1 optionally operates while the vehicle is in the "on" position to record activity that occurs inside the vehicle. The vehicle security surveillance system 1 is initially activated in a "valet" or "service attendant" mode by a manual activation or an encoded valet key that can be turned on/off by the vehicle owner before handing the vehicle over to the valet or service attendant. In the "on" position, the vehicle security surveillance system 1 will monitor all activity inside of the vehicle with at least one camera 10 located in the vehicle's interior to record the contents left behind, snooping, theft, and driving habits of the valet or service attendant. The vehicle security surveillance system 1 will deactivate once the vehicle ignition has been turned off and the valet or service attendant has exited the vehicle's interior and shut the door. Once this has occurred the security system will go into a "shut down" mode after the door is closed, which allows the cameras and recording system to monitor and sense motion inside of the vehicle for approximately two minutes to ensure the absence of activity and ensure vehicle contents. After the predetermined time elapses, such as the exemplary two minute period, the vehicle security surveillance system 1 resumes its normal "stand-by" mode while the vehicle is in the off position awaiting triggered activation of at least one camera 10 as described above. This embodiment of the vehicle security surveillance system 1 will have the option to selectively engage at least one camera 10 with a valet switch.

As generally depicted Referring now to the drawings, and in particular FIGS. 1-8, a vehicle security surveillance system 1 includes the following. A camera 10 installed within a vehicle's interior, see FIGS. 4-5. The camera 10 includes motion sensors 15 and software 16. Optionally, the camera includes shock sensors 13 such that the camera 10 will start recording images when the motion sensor 15 and-or the shock sensors 13 trigger to render the camera 10 to record. Inasmuch, the camera 10 generates digital images of the interior of the vehicle. In operation, in one embodiment, the camera 10 is normally rendered in a "stand-by" mode until trigger-activated to generate digital images.

The vehicle security surveillance system 1 includes a memory device 12 that is coupled to the camera 10. In one embodiment, a flash memory device 12*a* is removable from the vehicle security surveillance system 1. In particular, the vehicle security surveillance system 1 includes an external device interface 14*a* coupled to the flash memory device 12*a* such that the external device interface 14*a* facilitates removal of digital images from the memory device 12 as shown in FIG. 2.

The vehicle security surveillance system 1 includes a wiring interface 17 that is coupled to a power supply 20. In one embodiment the memory device 12 comprises a micro hard drive. In particular, the wiring interface provides a positive (+) wire and a negative (−) wire to at least the memory device 12.

The vehicle security surveillance system 1 includes an image packet application 16*a* that is coupled to a network module 20 and the software 16. The software 16 is further coupled to the network module 20 as well. The software 16 executed in at least one computer readable device, such as a processor, of the camera 10 facilitates operation of the camera 10 motion sensors 15, and memory device 12 among other components of the vehicle security surveillance system 1.

In particular, the image packet application 16*a* may be readily recognized as either a software or hardware embodiment for facilitating, at least in part, generation of at least one vehicle interior image packet. A general illustration of at least one interior image packet is visually shown in FIG. 7. The image packet application 16*a* obtains the time and date 92 from a packet header 90 shown in FIG. 6 and creates "time and date stamp" indicia 94 for visual display with images from the corresponding image packet 98 as illustratively shown in FIG. 7. Each digital image includes time and date stamp indicia 94 on each digital image 98 including each image frame whether a still frame or as part of a video.

Operatively, on receiving a trigger from at least the motion sensors 15, the camera 10 is rendered to record digital images to the memory device 12 and the image packet application 16*a* initiates generation of at least one vehicle interior image packet. In one embodiment, during recording, the software 16 encrypts the digital images while recording to the memory device 12 so that each image file cannot be tampered with. In one embodiment, the software 16 provides an application for decryption.

Optionally, the software 16 also provides an application for selective decryption. For example, the selective decryption application in one embodiment requires a restricted code used by law enforcement to decrypt the image files so as to prevent third party tampering of potentially admissible evidence in the recorded image files. In some jurisdictions, encrypted files are suitable means for legally admissible evidence in a law enforcement proceeding.

In one further embodiment, the software 16 provides a counter application that accounts for the number of downloads from the vehicle security surveillance system 1 of an encrypted digital image. As such, the counter application facilitates tracking and thus potentially preventing tampering with a decrypted digital image to ultimately enhance the quality of admissibility to lay a proper legal foundation of such a digital file as legal evidence. For example, the quality of admissibility to lay a proper legal foundation of such a digital file may include, among others, the following: software aspects that prevent modification of the digital file including changes, additions or deletions of the digital file; software aspects that prevent further duplication of the digital file; software and indicia aspects indicating that the vehicle security surveillance system 1 was operating properly while producing the recorded digital file; and automated operational sequences of the vehicle security surveillance system 1 to refute legal objections regarding the competency of a human operator.

Figures 6, 7:
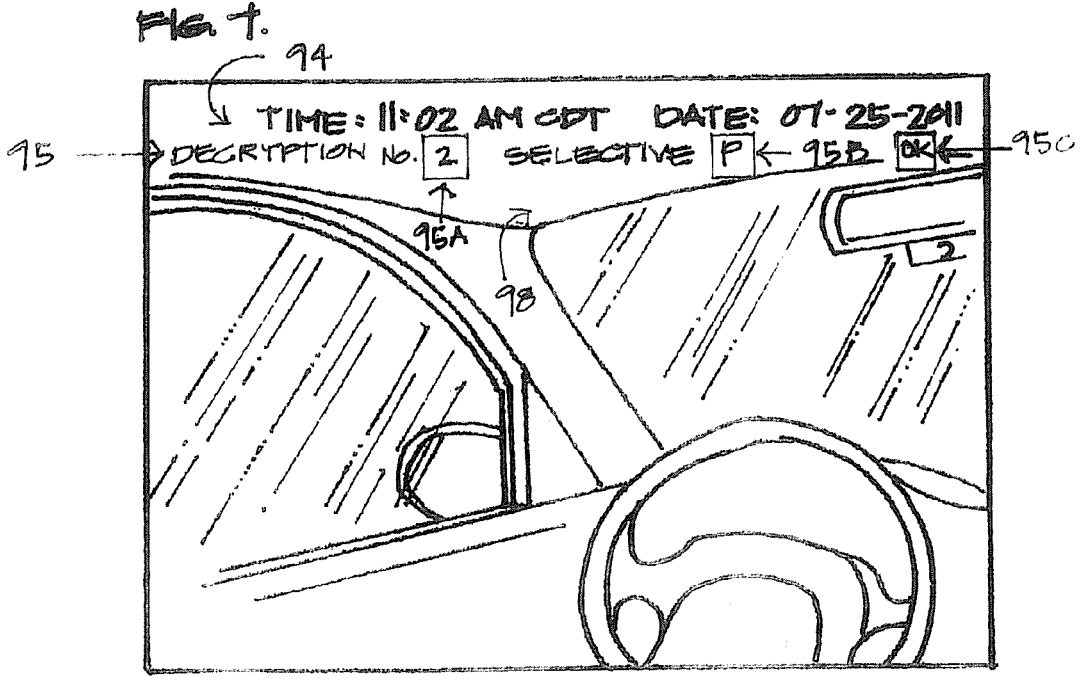
FIG. 6 is a general illustration of a vehicle interior image packet's header.
FIG. 7 is a general illustration of at least one vehicle interior image packet featuring "time and date stamp" indicia as displayed along with at least one digital image of the interior of a vehicle and encryption status of the at least one digital image.

Illustratively, the at least one vehicle interior image packet of FIG. 7 features at least one digital image of the interior of the vehicle 98 having "time and date stamp" indicia 94 and encryption status indicia 95 of the at least one digital image 98. Specifically, in accordance with the above, the encryption status indicia 95 shows the image 98 was "decrypted". Moreover, counter status indicia 95A, obtained from a counter application, shows "2" which means that two downloads of this image 98 were obtained from the vehicle security surveillance system 1. Selective decryption status indicia 95B, obtained from a selective decryption application, shows "P" which means that specifically the police decrypted this particular image file 98. In furthering this illustration, a counter status indicia 95A of "1" and a decryption status indicia 95B of "I" would thus indicate that an insurance company (for the letter "I") was the first entity (for the number "1") to download and decrypt the image 98 of FIG. 7 from the vehicle security surveillance system 1. Furthermore, the at least one vehicle interior image packet of FIG. 7 features at least one digital image of the interior of the vehicle 98 having "vehicle security surveillance system 1 operational status" indicia 95C of "OK" indicating that the vehicle security surveillance system 1 was operating properly while producing the recorded digital file, as opposed the alternative "vehicle security surveillance system 1 operational status" indicia of "ERROR" (not shown) to indicate that the vehicle security surveillance system 1 was not operating properly while producing the recorded digital file.

In at least one embodiment, each decrypted image file is a "read only" file which in this application and appended claims refers to an attribute of the file which prevents editing such file. In at least one embodiment, each decrypted image file features a software attribute for preventing further duplication of such decrypted image file. Accordingly, one would thus download another decrypted image file only from the source vehicle security surveillance system 1 to obtain a copy. In the continuing illustration, the counter status indicia 95A, obtained from a counter application, would account for such a further copy as an additional download by visually showing "3" which means that three downloads of this image 98 were obtained from the source vehicle security surveillance system 1.

Further in operation, the at least one vehicle interior image packet is sent from the vehicle security surveillance system 1 via the network interface module 20. In at least one embodiment, the at least one vehicle interior image packet is sent from the vehicle security surveillance system 1, via the network interface module 20, wherein each digital image is encrypted. As shown in FIG. 2, the network interface module 20 includes network interface hardware 21 network interface software 22 and a wireless transmitter 23 among other components.

Figure 3:
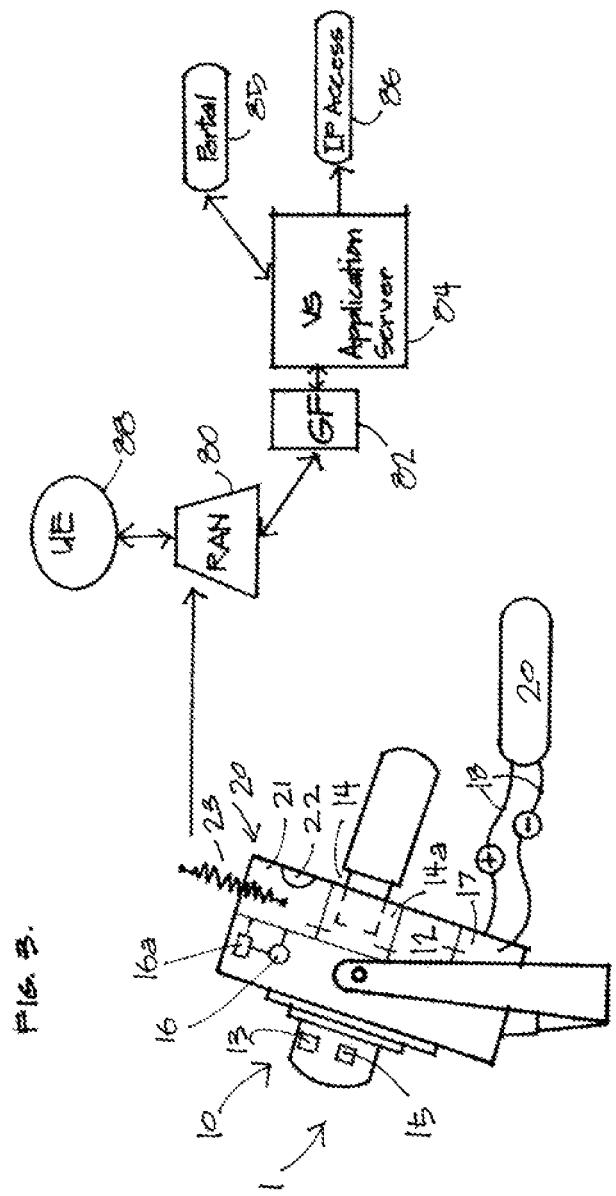
FIG. 3 is a schematic network diagram of a vehicle security surveillance system for providing at least one interior image packet including encrypted digital images to an application server.

Each digital image 98 is encrypted via the image packet application 16a. As shown in FIG. 3, in at least one illustrative embodiment, the at least one vehicle interior image packet is received by an application server 84 such as a video share application server. Specifically, the network interface module 20 sends at least one interior image packet to the nearest, operational radio access network such as a wireless radio access tower. From the radio access network, the at least one interior image packet is sent through a gateway function 82 to the application server 84, such as an application server compatible with Video Share protocol.

From the application server 84, at least one vehicle interior image packet is sent to user equipment such as Video Share user equipment (UE) device 88. In one embodiment, the Video Share user equipment (UE) includes a wireless mobile phone and a tablet such that the user of the mobile phone receives the interior image packet providing the general time date and image of a vehicles interior generally during the time of unauthorized entry into the vehicle interior. In one embodiment, the interior image packet remains encrypted until selectively decrypted so as not to destroy the legally admissibility of such packet as evidence.

Moreover, for the embodiment to FIG. 3, the application server 84 sends at least one vehicle interior image packet to one internet protocol access device 86 to alert the device 86 operator, via the internet, of unauthorized access into the vehicle's interior. Moreover, the application server 84 sends at least one vehicle interior image packet to a portal 85, such as a virtual private network portal, informing the portal subscriber of unauthorized vehicle entry.

Referring now to one exemplary embodiment, an aftermarket vehicle security surveillance system 1 includes a charge-coupled device (CCD) camera 10. The CCD camera 10 is installed within a vehicle's interior. The CCD camera 10 includes motion sensors 15 and software 16. The CCD camera 10 generates digital images 98 of the interior of the vehicle. The CCD camera 10 is rendered in a stand-by mode until trigger-activated to generate the digital images.

The aftermarket vehicle security surveillance system 1 includes a micro hard drive 12 coupled to the CCD camera 10. A universal serial bus (USB) plug 14 is coupled to micro hard drive 12. In operation, the USB plug 14 facilitates removal of digital images from the micro hard drive 12. The aftermarket vehicle security surveillance system 1 further includes wiring 18 that is coupled to a power supply 20.

The aftermarket vehicle security surveillance system 1 includes a network interface module 20 that is coupled to the software 16 and includes an image packet application 16a. The image packet application 16a facilitates, at least in part, generation of at least one image packet. Each digital image is encrypted via the image packet application 16a. The software 16 of the CCD camera 10 facilitates operation of at least the CCD camera 10, motion sensors 15, and micro hard drive 12. Operationally, on a trigger received from motion sensors 15, the CCD camera 10 is rendered to record digital images to the micro hard drive 12.

With reference to FIG. 8, a method for surveillance of a vehicle 100 is appreciated as follows. At 102, a vehicle security surveillance system is rendered in a stand-by mode while the vehicle is parked. The vehicle security surveillance system is identical to the vehicle security surveillance system as discussed above.

At 104, motion sensors 15 trigger at least one camera 10 to activate from the standby mode. Optionally, the camera 10 maybe trigger-activated with shock sensors 13. Each camera 10 generates digital images of the interior of the vehicle. At 106, software 16, embodied in at least one processor coupled to camera 10, records the digital images from at least one camera 10 to a memory device 12.

Specifically, generating a digital image with the camera 10 includes creating "time and date stamp" indicia based on the time and date 92 provided on a packet header 90 from the corresponding vehicle interior image packet and integrating "time and date stamp" indicia 94 for visual display on each digital image 98 as shown in FIG. 7.

The digital images at 108 are stored with a self-cleaning program executed by the software 16. In particular, a digital image file for each camera is stored in a corresponding folder. Each folder includes a predetermined number of subfolders such that the self-cleaning program deletes the contents of the oldest subfolder to store a subsequent digital image file within the contents-deleted subfolder.

At 110, an image packet application generates at least one vehicle interior image packet. A network interface module 20 at 112 sends the at least one interior image packet, encrypted, from the vehicle security surveillance system 1. In one embodiment an application server 84, such as a Video Share protocol application server, receives at least one vehicle interior image packet from the network interface module 20. At least one vehicle interior image packet is sent to at least one UE device.

Optionally, the vehicle security surveillance system is rendered in a "valet" or "service attendant" mode that includes the following. While the vehicle's engine is ignited, a vehicle security surveillance system 1 is engaged, such as with a button or encoded valet key. The vehicle is provided to the valet or service attendant. While the vehicle's engine is engaged, digital images of the interior of the vehicle are recorded from the at least one activated camera 10 to the memory device 12 to record the activities of the operator while the vehicle owner is away. The "valet" or "service attendant" mode is disengaged when the vehicle's engine is turned off.

Optionally, vehicle security surveillance system 1 may be rendered in a "shutdown" mode in the following manner. In the "shutdown" mode, the at least one camera 10 continues to record digital images of the interior of the vehicle to the memory device 12 while the vehicle's engine is turned off after a "valet" or "service attendant" mode is disengaged.

The "shutdown" mode is disengaged after a predetermined amount of time, such as, two minutes, without trigger-activation of at least one camera 10. Optionally, after a predetermined period elapses, such as the exemplary two minute period, the vehicle security surveillance system 1 resumes its normal "stand-by" mode while the vehicle's engine is in the off position awaiting trigger-activation of at least one camera as described above.

Although the present invention has been described in detail, it should be understood that various changes, substitutions, and alterations could be made hereto without departing from the spirit and scope of the invention as defined by the appended claims.

I claim:

1. A vehicle security surveillance system comprising:
a camera configured to be installed within a vehicle's interior, the camera including one or more motion sensors and a processor, wherein (a) the processor is configured to facilitate operation of the camera and the one or more motion sensors, and (b) the camera is configured to be in stand-by mode and to generate one or more digital images of the interior of the vehicle when the one or more motion sensors trigger activation of the camera;
an image packet application configured to facilitate generation of at least one vehicle interior image packet comprising (i) an encrypted digital image generated by the camera, (ii) an image capture time indicator, (iii) an image capture date indicator, (iv) a counter status indicator for tracking a number of times the vehicle interior image packet has been downloaded, and (v) a decryption status indicator for identifying a person or entity requesting decryption, wherein the image packet application, upon receipt of a valid request for decryption including a decryption code for the vehicle interior image packet, creates an encrypted vehicle interior image packet from the vehicle interior image packet comprising current status information that includes the decryption status indicator including a predefined one letter code that identifies the person or entity requesting decryption and an updated count of the counter status indicator so that veracity of the vehicle interior image packet is documented to enhance admissibility in legal proceedings;
a memory device, the memory device coupled to the camera and configured to store the one or more digital images generated by the camera;
an external device interface coupled to the memory device, wherein the external device interface is configured to facilitate removal of the one or more digital images from the memory device;
a network interface configured to send the encrypted vehicle interior image packet from the vehicle security surveillance system; and
a wiring interface coupled to a power supply.

2. The vehicle security surveillance system according to claim 1 further comprising a Video Share application server configured to send at least one vehicle interior image packet to a Video Share User Equipment (UE) device.

3. The vehicle security surveillance system according to claim 2 wherein the Video Share UE device comprises a mobile phone.

4. The vehicle security surveillance system according to claim 1 wherein the camera further comprises shock sensors.

5. The vehicle security surveillance system according to claim 1, wherein the at least one encrypted vehicle interior image packet requires a restricted code for decrypting.

6. A vehicle security surveillance system comprising:
a charge-coupled device (CCD) camera, configured to be installed within a vehicle's interior and comprising motion sensors and a processor, wherein the CCD camera is configured to be in stand-by mode and to generate one or more digital images of the interior of the vehicle when the CCD camera is trigger-activated by the motion sensors to generate digital images, and the processor is configured to facilitate operation of the CCD camera and the motion sensors;
an image packet application configured to facilitate generation of at least one vehicle interior image packet comprising (i) an encrypted digital image generated by the CCD camera, (ii) an image capture time indicator, (iii) an image capture date indicator, (iv) a counter status indicator for tracking a number of times the vehicle interior image packet has been downloaded, and (v) a decryption status indicator for identifying a person or entity requesting decryption, wherein the image packet application, upon receipt of a valid request for decryption including a decryption code for the vehicle interior image packet, creates an encrypted vehicle interior image packet from the vehicle interior image packet comprising current status information that includes the decryption status indicator including a predefined one letter code that identifies the person or entity requesting decryption and an updated count of the counter status indicator so that veracity of the vehicle interior image packet is documented to enhance admissibility in legal proceedings;
a micro hard drive coupled to the CCD camera and configured to store the one or more digital images generated by the CCD camera;
universal serial bus (USB) plug coupled to the micro hard drive, wherein the USB plug is configured to facilitate removal of the one or more digital images from the micro hard drive;
a network interface configured to transmit the encrypted vehicle interior image packet; and
a power supply.

7. A method for surveillance of a vehicle including:
rendering a vehicle security surveillance system in a stand-by mode while the vehicle is parked,
generating one or more digital images of an interior of the vehicle by at least one camera when the at least one camera is activated by triggering of a motion sensor;
generating of at least one vehicle interior image packet comprising (i) an encrypted digital image generated by the camera, (ii) an image capture time indicator, (iii) an image capture date indicator, (iv) a counter status indicator for tracking a number of times the vehicle interior image packet has been downloaded, and (v) a decryption status indicator for identifying a person or entity requesting decryption, wherein, upon receiving a valid request for decryption including a decryption code for the vehicle interior image packet, creating an encrypted vehicle interior image packet from the vehicle interior image packet comprising current status information that includes the decryption status indicator including a predefined one letter code that identifies the person or entity requesting decryption and an updated count of the counter status indicator so that veracity of the vehicle interior image packet is documented to enhance admissibility in legal proceedings;
recording the one or more digital images generated by the at least one camera onto a memory device; and sending the encrypted vehicle interior image packet from the vehicle security surveillance system, via a network interface module.

8. The method according to claim 7 wherein the at least one camera is activated by shock sensors.

9. The method according to claim 7 further comprising sending at least one vehicle interior image packet to a Video Share Application Server from the network interface module.

10. The method according to claim 7, further comprising a step of sending the encrypted vehicle interior image packet to at least one user equipment device.

11. The method according to claim 7, wherein the one or more digital images are recorded on the memory device via a self-cleaning program.

12. The method according to claim 11 wherein the step of recording the one or more digital images further comprises the steps of:
  storing a digital image file for the at least one camera in a corresponding folder, each folder including a predetermined number of subfolders; and
  deleting the digital image file of an oldest subfolder to generate a contents-deleted subfolder to store a subsequent digital image file.

13. The method according to claim 7 further comprising engaging a valet or service attendant mode.

* * * * *